US012730399B2

(12) United States Patent
Tanto

(10) Patent No.: US 12,730,399 B2
(45) Date of Patent: Sep. 8, 2026

(54) FIXING DEVICE HAVING HOLDING MEMBER WITH MULTIPLE GROOVE PORTIONS

(71) Applicant: CANON KABUSHIKI KAISHA, Tokyo (JP)

(72) Inventor: Tomoaki Tanto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/813,203

(22) Filed: Aug. 23, 2024

(65) Prior Publication Data

US 2025/0123582 A1 Apr. 17, 2025

(30) Foreign Application Priority Data

Oct. 13, 2023 (JP) ................................ 2023-177244

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
USPC .......................................................... 399/328
See application file for complete search history.

(56) References Cited

U.S. PATENT DOCUMENTS

2016/0246229 A1* 8/2016 Taguchi ............. G03G 15/2053
2020/0209791 A1* 7/2020 Seki ................... G03G 15/2042

FOREIGN PATENT DOCUMENTS

JP 2018054898 A 4/2018

* cited by examiner

*Primary Examiner* — Quana Grainger
(74) *Attorney, Agent, or Firm* — Venable LLP

(57) ABSTRACT

A fixing device has a heating member for fixing a toner image and a holding member holding the heating member. The holding member includes a first groove portion on one end portion side of the holding member in a longitudinal direction of the holding member, the heating member being fitted into the first groove portion; a second groove portion closer to a central portion of the holding member in the longitudinal direction than the first groove portion, a width of the second groove portion being larger than that of the first groove portion in a widthwise direction of the holding member; a tapered portion that connects the first groove portion to the second groove portion; and a surface of an end portion of the first groove portion in the longitudinal direction that is perpendicular to a surface of an end portion of the first groove portion in the widthwise direction.

18 Claims, 7 Drawing Sheets

FIXING DEVICE HAVING HOLDING MEMBER WITH MULTIPLE GROOVE PORTIONS

BACKGROUND OF THE INVENTION

Field of the Invention

This invention relates to an image forming apparatus such as a copying machine, a printer, a facsimile device using an electrophotographic system or electrostatic recording system, and a multifunction apparatus with these functions. This invention relates especially to a fixing device that fixes an unfixed toner image onto a recording material and that is used in an image forming apparatus with an electrophotographic system.

Description of the Related Art

As a fixing device that is used in an image forming apparatus with an electrophotographic system and that fixes an unfixed toner image onto a recording material by thermo-melting, a roller fixing system is generally known. In a roller fixing system, a nip portion is formed by pressing a pressing roller against a fixing roller having a heater inside, and an unfixed toner image is fixed onto a recording material by nipping and conveying the recording material at the nip portion.

In particular, in recent years, a fixing device with a film heating system is in practical use in view of quick start and energy saving. In a fixing device with a film heating system, a pressing nip portion as a fixing nip portion is formed with a fixing film as a heat transfer member being nipped between a ceramic heater as a heating member and a pressure roller as a pressing member, and a recording material bearing an unfixed toner image is nipped and conveyed together with the fixing film between the fixing film of the fixing nip portion and the pressure roller at the fixing nip portion. As a result, the unfixed toner image is fixed onto the surface of the recording material with the pressing force of the fixing nip portion while being given heat via the fixing film.

A sliding member used in a fixing device with the film heating system such as a fixing film and a heater is one of the key parts that should be more strictly controlled in terms of their surface properties and alignment as compared with other parts. For example, when a scratch is made on such parts or the alignment of such parts deviates from the desired one in an irregular work during a human assembly work, they are required to be exchanged. Therefore, such parts should be more strictly handled as compared to other parts.

The Japanese Patent Application Laid-Open No. 2018-54898 discloses a fixing device of a film heating system, wherein a heater is positioned by abutting the heater against protruding surfaces on both end portions in the longitudinal direction of a groove provided for fitting the heater into a pressing member when the heater is attached to the pressing member which is to hold the heater.

On the other hand, recently, the attempts are being made to improve quality of a device by assembling a film unit including a film and a heater which should be strictly handled in this way by using an automatic production machine capable of performing more stable assemblage than human assembly work.

SUMMARY OF THE INVENTION

A fixing device of the present invention comprising:

a heating member for fixing a toner image on a recording medium; and a holding member that holds the heating member, wherein the holding member includes:

- a first groove portion provided on one end portion side of the holding member in a longitudinal direction of the holding member, the heating member being to be fitted into the first groove portion;
- a second groove portion provided at a location closer to a central portion of the holding member in the longitudinal direction of the holding member than the first groove portion, a width of the second groove portion is larger than that of the first groove portion in a widthwise direction of the holding member;
- a tapered portion that connects the first groove portion to the second groove portion; and
- a surface of an end portion of the first groove portion in the longitudinal direction of the holding member that is perpendicular to a surface of an end portion of the first groove portion in the widthwise direction of the holding member.

Further features of the present invention will become apparent from the following description of exemplary embodiments with reference to the attached drawings.

DESCRIPTION OF THE EMBODIMENTS

Hereinafter, with reference to the drawings, a preferable embodiment of the present invention will be described in detail. The structural elements in the following embodiment are only examples, so that the configuration, and various conditions on functions, dimensions, materials, shapes, and relative arrangement can be modified or changed as appropriate without departing from the gist of the present invention, and they are not intended to be limited to the following embodiment.

Figure 1:
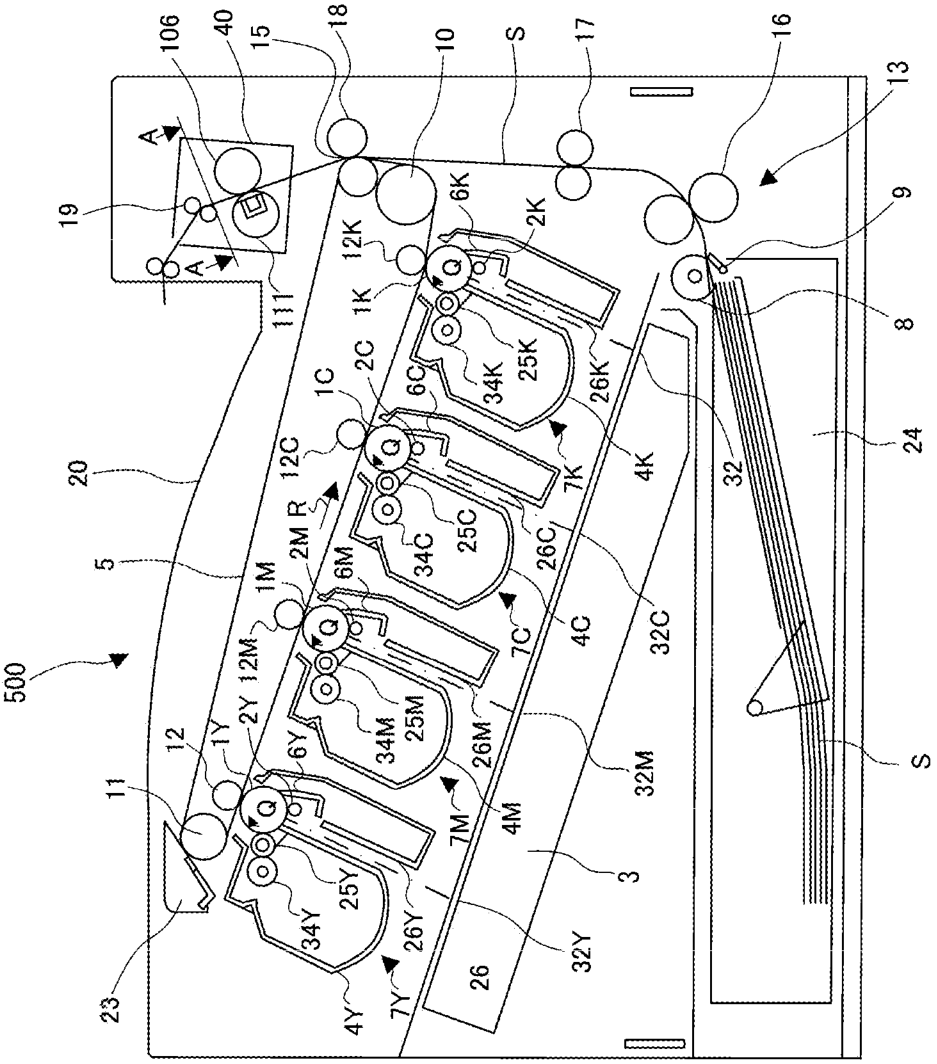
FIG. 1 is a schematic diagram showing a front cross-sectional view of an image forming apparatus according to an embodiment of the present invention.

FIG. 1 is a schematic diagram showing a front cross-sectional view of an image forming apparatus according to an embodiment of the present invention.

In FIG. 1, the image forming apparatus 500 forms images of the colors yellow (Y), magenta (M), cyan (C) and black (K) using the four cartridges 7Y, 7M, 7C and 7K that are parallelly provided in an up and down oblique direction as image forming portions. The cartridges 7Y, 7M, 7C and 7K are respectively provided with the photosensitive drum units 26Y, 26M, 26C and 26K having the photosensitive drums 1Y, 1M, 1C and 1K, and the developing units 4Y, 4M, 4C and 4K.

The photosensitive drums 1Y, 1M, 1C and 1K are respectively driven to rotate in the clockwise direction (the direction indicated by Q) in FIG. 1 by a driving member (not shown). The cleaning members 6Y, 6M, 6C and 6K, the charging rollers 2Y, 2M, 2C and 2K, the developing units 4Y, 4M, 4C and 4K are disposed around the photosensitive drums 1Y, 1M, 1C and 1K, respectively.

The cleaning members 6Y, 6M, 6C and 6K remove remaining toner left on the photosensitive drums 1Y, 1M, 1C and 1K after the toner images formed on the photosensitive drums 1Y, 1M, 1C and 1K have been transferred onto the intermediate transfer film 5. The remaining toner removed by the cleaning members 6Y, 6M, 6C and 6K is collected into a removed toner chamber in the photosensitive drum units 26Y, 26M, 26C and 26K.

The charging rollers 2Y, 2M, 2C and 2K uniformly charge the surfaces of the photosensitive drums 1Y, 1M, 1C and 1K, respectively. After the surfaces of the photosensitive drums 1Y, 1M, 1C and 1K are charged by the charging rollers 2Y, 2M, 2C and 2K, the photosensitive drums 1Y, 1M, 1C and 1K are respectively exposed with laser beams which are emitted from the scanner unit (exposing means) 3 and which pass through the unit openings 32Y, 32M, 32C and 32K. As a result, electrostatic latent images for yellow (Y), magenta (M), cyan (C) and black (K) are respectively formed on the surfaces of the photosensitive drums 1Y, 1M, 1C and 1K. The scanner unit 3 is disposed under the cartridges 7Y, 7M, 7C and 7K in the present embodiment.

The developing units 4Y, 4M, 4C and 4K respectively supply the electrostatic latent images formed on the surfaces of the photosensitive drums 1Y, 1M, 1C and 1K with toner of yellow (Y), magenta (M), cyan (C) and black (K) to develop the electrostatic latent images into the toner images of yellow (Y), magenta (M), cyan (C) and black (K). The developing units 4Y, 4M, 4C and 4K are respectively provided with the developing rollers 25Y, 25M, 25C and 25K that are in contact with the photosensitive drums 1Y, 1M, 1C and 1K and that supply toner onto the surfaces of the photosensitive drums 1Y, 1M, 1C and 1K, and the supplying rollers 34Y, 34M, 34C and 34K that are in contact with the developing rollers 25Y, 25M, 25C and 25K and that supply toner on the developing rollers 25Y, 25M, 25C and 25K.

When an image is formed on the recording material S, electrostatic latent images formed on the surfaces of the photosensitive drums 1Y, 1M, 1C and 1K by the scanner unit 3 are developed into toner images and transferred onto the intermediate transfer film 5 by the cartridges 7Y, 7M, 7C and 7K.

The intermediate transfer film 5 is stretched around the driving roller 10 and the tension roller 11 and driven to rotate in the direction indicated by arrow R in FIG. 1. Further, the primary transfer rollers 12Y, 12M, 12C and 12K are disposed inside the intermediate transfer film 5 respectively being opposed to the photosensitive drums 1Y, 1M, 1C and 1K. Transfer biases are applied to the primary transfer rollers 12Y, 12M, 12C and 12K by bias applying means (not shown).

For example, when negatively charged toner is used, positive biases are applied to the primary transfer rollers 12Y, 12M, 12C and 12K so that the toner images of yellow (Y), magenta (M), cyan (C) and black (K) are primarily transferred being superimposed. The toner images of yellow (Y), magenta (M), cyan (C) and black (K) superimposed to each other on the intermediate transfer film 5 are conveyed to the secondary transfer portion 15.

In this case, the toner left on the intermediate transfer film 5 after the secondary transfer to the recording material S is removed by the transfer film cleaning device 23. The removed toner passes through a waste toner conveying path (not shown) and is collected in a waste toner collecting container (not shown).

Meanwhile, the recording material S is fed toward the secondary transfer portion 15 by the conveying mechanism including the feeding device 13 and the registration roller pair 17 in synchronism with the above described image forming operation.

The feeing device 13 includes the sheet cassette 24 for accommodating the recording materials S, the feeding roller 8 that feeds the recording materials S and the conveying roller pair 16 that conveys the fed recording materials S.

The sheet cassette 24 is configured to be detachably attachable to the image forming apparatus 500. A user draws out the sheet cassette 24 to remove it from the image forming apparatus 500, sets the recording materials S in the sheet cassette 24, and then inserts the sheet cassette 24 into the image forming apparatus 500 again so that the replenishment of recording materials S is completed.

The feeding roller 8 presses the uppermost recording material S out of the recording materials S accommodated in the sheet cassette 24 so that the recording materials S are separated one sheet by one sheet by the separation pad 9 (using friction piece separation method) with the rotation of the feeding roller 8.

The recording material S conveyed from the feeding device 13 is further conveyed to the secondary transfer portion 15 by the registration roller pair 17. In the secondary transfer portion 15, a positive bias is applied to the secondary transfer roller 18 so that the toner imagers of the four colors of yellow (Y), magenta (M), cyan (C) and black (K) on the intermediate transfer film 5 are secondarily transferred onto the conveyed recording material S.

Further, the recording material S is conveyed from the secondary transfer portion 15 to the fixing device 40 where the unfixed toner image transferred on the recording material S is heated and pressed to fix the unfixed toner image on the recording material S. Thereafter, the recording material S on which the toner image is fixed is discharged onto the discharge tray 20 by the discharge roller pair 19.

Next, the configuration of the fixing device 40 according to the present embodiment will be described. The fixing device 40 according to the present embodiment adopts the film heating system and the pressure roller driving system using a fixing film having an elastic layer formed a base layer that is of a cylindrical thin metal.

Figure 2A:
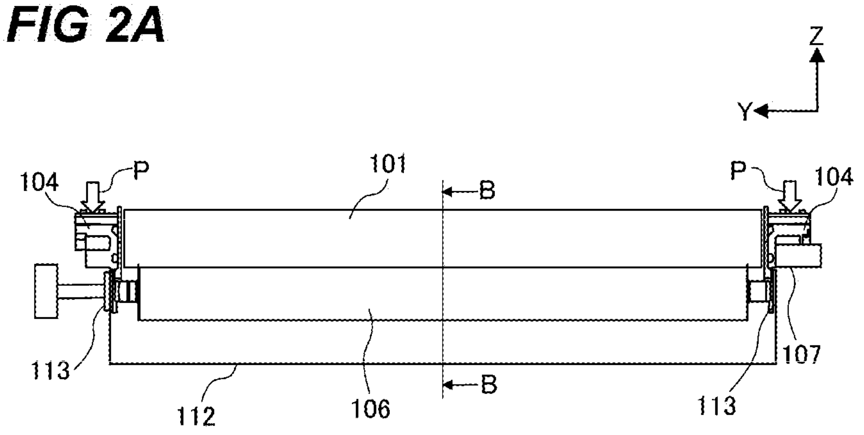
FIGS. 2A and 2B are diagrams showing a cross-sectional view of the fixing device shown in FIG. 1 according to the embodiment of the present invention.
Figure 2B:
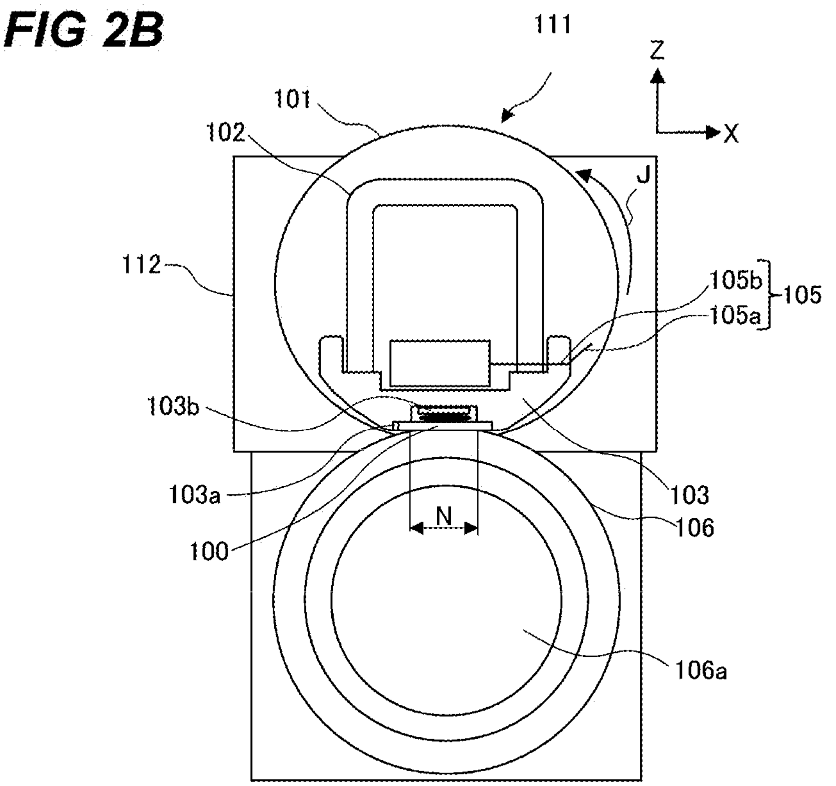

FIGS. 2A and 2B show the configuration of the fixing device 40. FIG. 2A is a diagram showing the A-A cross-sectional view of the fixing device 40 in the longitudinal direction of the fixing device 40 indicated in FIG. 1. FIG. 2B is a diagram showing the B-B cross-sectional view of the fixing device 40 in the widthwise direction.

As shown in FIGS. 2A and 2B, the fixing device 40 includes the pressure roller 106 as a pressure member, the heater 100 as a heating member, the fixing film 101 that is a cylindrical rotating member as a fixing member, the thermistor 105 that detects the temperature of the inner surface of the fixing film 101, the fixing flanges 104 that are provided at both end portions of the cylindrical fixing film and restricts the moving amount of the fixing film 101 in the direction of the rotational axis of the fixing film 101, the pressing member 103 that forms the nip portion N between the pressure roller 106 and the pressing member 103 with the fixing film 101 being nipped, the stay 102 disposed at the inner surface side of the fixing film for ensuring the strength of the pressing member 103, and the connector 107 for supplying electric power from the image forming apparatus 500 to the heater 100.

In the following, the combination of the fixing film 101, the heater 100, the pressing member 103, the stay 102, the fixing flange 104, the thermistor 105 and the connector 107 is referred to as the film unit 111. In the present embodiment, the widthwise direction of the film unit 111 is defined as the direction X, the longitudinal direction (direction of the rotational axis) of the film unit is defined as the direction Y, and the pressing direction of the film unit, which will be described later is defined the direction Z.

The pressure roller 106 as a pressing member includes the core metal 106*a* and a heat-resistant elastic layer co-axially and integrally provided on the core metal 106*a*. The elastic layer is molded and covers the core metal 106*a* in a roller-shape by silicone rubber, fluoro rubber, fluoro resin and the like. Further, a toner releasing layer is provided on the surface layer. The material of the toner releasing layer can be selected from fluoro resin, silicone resin, fluoro silicone rubber, fluoro rubber, silicone rubber, PFA, PTFE, FEP and the like, which show good toner releasing and heat resist properties. The bearing members 113 made from heat-resistant resin such as PEEK, PPS and liquid crystal polymer are attached to both end portions of the core metal 106*a* such that the bearing members 113 are disposed on the side plate of the fixing frame 112 to be freely rotatably held. When the pressure roller 106 rotates by receiving a driving force from a fixing motor (not shown) provided in the image forming apparatus 500, the fixing film 101 rotates in the direction indicated by arrow J in FIG. 2B by following the pressure roller 106.

The fixing film 101 is a cylindrical and heat-resistant heating member as a heating member for transmitting heat to the recording material S and is loosely and outwardly fitted to the pressing member 103. In order to improve the quick start property by decreasing the heat capacity, the fixing film 101 can be made from a single-layer film of PTFE, PFA and FEP having heat-resistant properties with the film thickness being smaller than 100 μm, preferably equal to or greater than 20 μm and equal to or smaller than 50 μm, or from a composite film of polyimide, polyamide imide, PEEK, PES, PPS or the like on the outer peripheral surface of which PTFE, PFA, FEP or the like is coated. Further, the fixing film 101 can be made from metal.

The heater 100 (ceramic heater in the present embodiment) is a heat emitting member (heat applying member). The heater 100 has the basic configuration of the combination of a long, narrow, and thin plate-shaped ceramic board and an energization heat generating resistor layer provided on the ceramic board. The heater 100 has a low heat capacity so that the temperature of the heater 100 increases with overall rapid temperature rising characteristics when electric power is supplied from the main body of the image forming apparatus to the heating member. The heater used in the present embodiment has a rectangular shape in which the end surfaces in the widthwise direction are perpendicular to the end surfaces in the longitudinal direction.

The pressing member 103 is of a substantially semicircular shape in a cross-section with its longitudinal direction being the direction crossing the conveying direction of the recording material S. The pressing member 103 has heat-resistant and adiabatic properties. Phenolic resin, polyimide resin, polyamide resin, polyamide imide resin, PEEK resin, PES resin, PPS resin, PFA resin, PTFE resin, LCP resin, and the like, which show good insulating and heat-resistant properties are used for the material of the pressing member 103. The pressing member 103 has functions of backing the fixing film 101, pressing the nip portion N formed by being in contact with the pressure roller 106, stabilizing the conveyance of the fixing film 101 during rotation. Further, the fitting groove 103*a* is provided on the lower surface of the pressing member 103 along the longitudinal direction and the heater 100 is to be held by being fitted into the fitting groove 103*a*. Therefore, the pressing member 103 has also the function of holding the heater 100.

The stay 102 is pressed onto the back surface of the pressing member 103, which is made of comparatively soft resin, in order to increase the strength of the pressing member 103 in the longitudinal direction and to straighten the pressing member 103.

The thermistor 105 as temperature detecting means detects a temperature of the inner surface of the fixing film and feeds it back to a control circuit (not shown). Thermistor 105 includes a holding portion (not shown) for being fixed to and held by the pressing member 103, the temperature detecting element portion 105*a* for detecting a temperature by being in contact with the inner surface of the fixing film, and the plate spring portion 105*b* having elasticity for urging the temperature detecting element portion 105*a* to the fixing film with a predetermined contact pressure. The plate spring is made of stainless steel and forms a part of electrically conductive path.

The fixing flange 104 is fitted to each end of the assembly body of the pressing member 103 and the stay 102 in order for guiding the rotation of the fixing film 101 and for preventing the fixing film 101 from being disengaged. As shown in FIG. 2A, the fixing flanges 104 disposed at both ends of the fixing film 101 are configured to press the film unit 111 and the pressure roller 106 by receiving a pressing force in the direction indicated by arrow P from a pressure plate (not shown) rotatably attached to the fixing flame 112.

Next, the procedures of attaching the heater 100 to the pressing member 103 in the assemblage will be described while comparing the case where the pressing member 103 according to the present embodiment is used with the case where a conventional pressing member is used.

Figure 3:
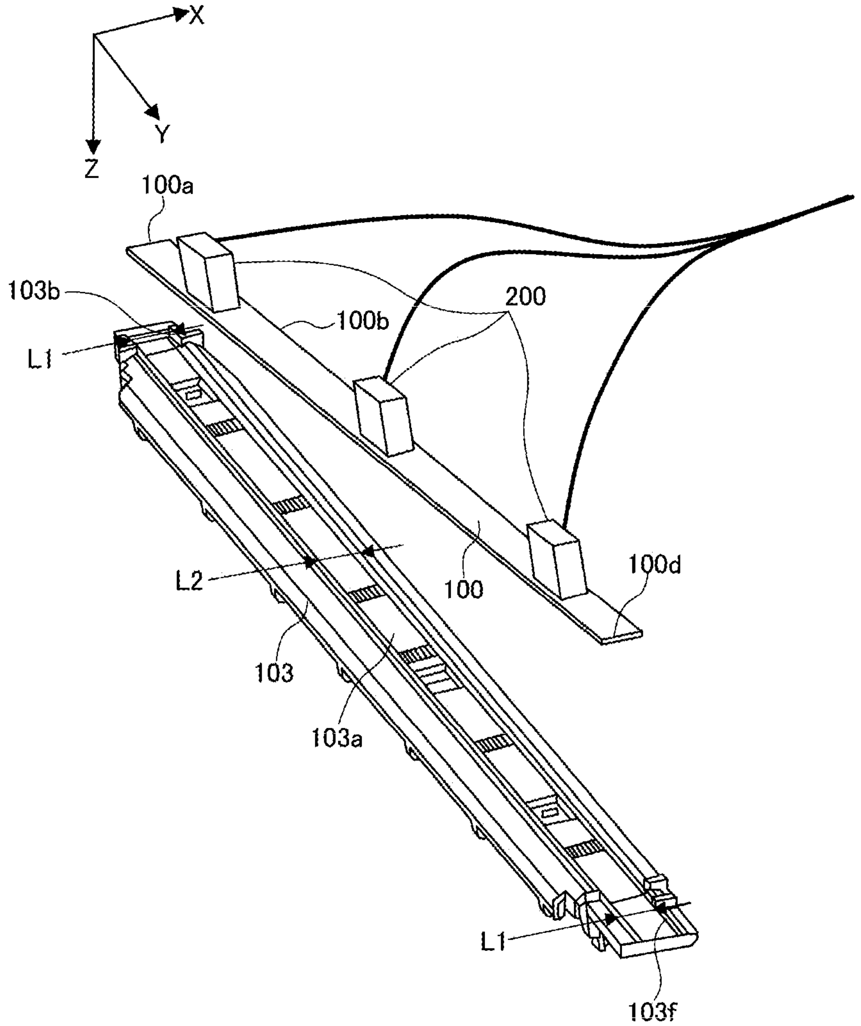
FIG. 3 is a diagram showing a perspective view of a heater and a pressing member of the fixing device according to the embodiment of the present invention in the state where the heater is being attached to the pressing member by an automatic production apparatus.

FIG. 3 is a diagram showing a perspective view of the heater 100 and the pressing member 103 in the state where the heater 100 is being attached to the pressing member 103 by an automatic production apparatus.

First, the case where the pressing member 103 according to the present embodiment is used will be described. The overall assembling procedures are as follows. First, as shown in FIG. 3, the heater 100 is sucked and raised by the suction portion 200 provided on the automatic production apparatus. Next, the one end portion 100*a* of the heater 100 in the longitudinal direction (direction Y) is brought closer to the groove 103*a* of the pressing member along the direction Z by tilting the heater 100. In this case, the other end portion 100*d* of the heater 100 in the direction Y is kept detached from the pressing member 103 in the direction Z. Finally, the both end portions 100*a* and 100*d* of the heater 100 in the direction Y are respectively fitted into the grooves with the groove width L1 provided on both sides of the groove 103*a* of the pressing member in the longitudinal direction (direction Y). The surface of the end portion 100*b* of the heater 100 in the widthwise direction (direction X) is positioned to the surfaces of the grooves 103*b*, 103*f* at the both end sides of the pressing member 103 in the widthwise direction (direction X).

Next, the procedures of attaching the heater 100 to the groove 103*a* of the pressing member 103 in the assemblage will be described in more detail.

Figure 4:
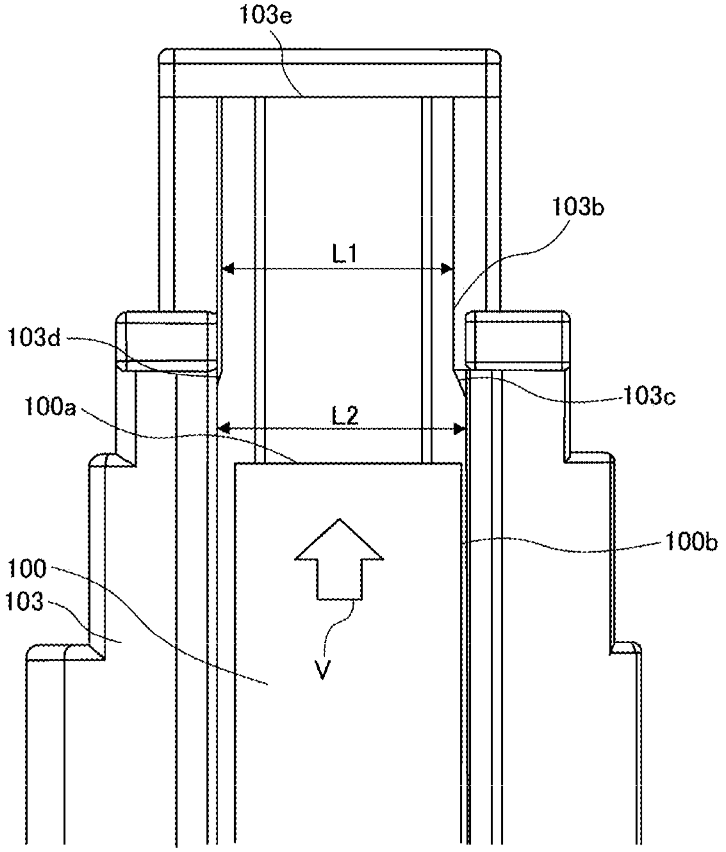
FIG. 4 is a diagram showing a top view of the heater and the pressing member of the fixing device according to the embodiment of the present invention in the state where the heater is being placed on the pressing member by an automatic production apparatus.

FIG. 4 is a diagram showing a top view of the heater 100 viewed along the direction Z in the case where the one end portion 100*a* of the heater 100 in the direction Y is placed on the pressing member 103 by the automatic production apparatus from the state shown in FIG. 3.

As shown in FIG. 4, the one end portion 100*a* of the heater 100 is first placed on a second groove portion with the groove width L2 located at the central part in the direction Y that is wider than a first groove portion with the groove width L1 located at both end portions of the pressing member 103 in the direction Y. As shown in FIG. 4, the pressing member 103 includes the positioning portion 103*b* that positions the heater 100 in the widthwise direction (direction X), which will be described in more detail later, the end portion 103*e* against which the heater 100 is abutted in the direction Y by the automatic production apparatus, and the inclined surfaces 103*c* and 103*d* as tapered portions (i.e., third grooves) that smoothly connect the first groove portion with the groove width L1 to the second groove portion with the groove width L2. In the state after the heater 100 is attached to the pressing member 103 in the assemblage, these tapered portions are disposed at the locations closer to the end portion sides than both end portions of the heating member provided inside the heater 100 in the widthwise direction.

Next, will be described the step of guiding the heater 100 from the region of the second groove portion with the groove width L2 of the pressing member 103 to the region of the first groove portion with the groove width L1 on the one end portion side in the longitudinal direction (direction Y).

FIGS. 5A, 5B, 6A and 6B are diagrams showing top views of heater 100 and the pressing member 103. Indicated in these figures is the step of guiding the heater 100 from the region of the second groove portion with the groove width L2 of the pressing member 103 to the region of the first groove portion with the groove width L1 on the one end portion side in the longitudinal direction (direction Y) from the state indicated by FIG. 4.

Figure 5A:
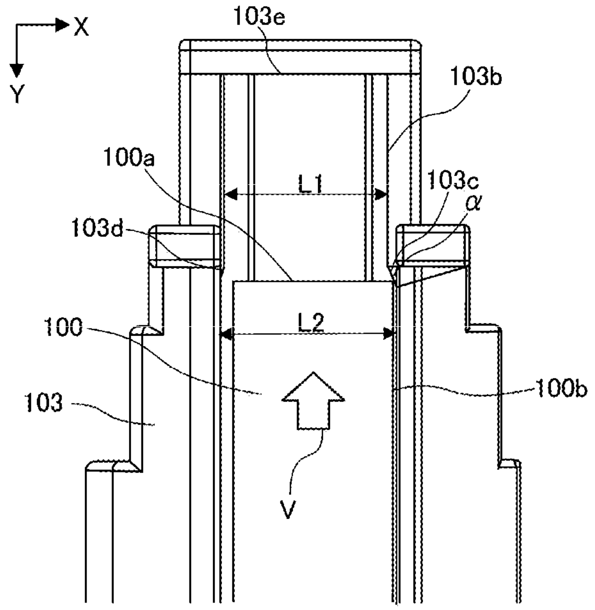
FIGS. 5A and 5B are diagrams showing a top view of the heater and the pressing member of the fixing device according to the embodiment of the present invention in the state where the heater is being moved on the pressing member.
Figure 5B:
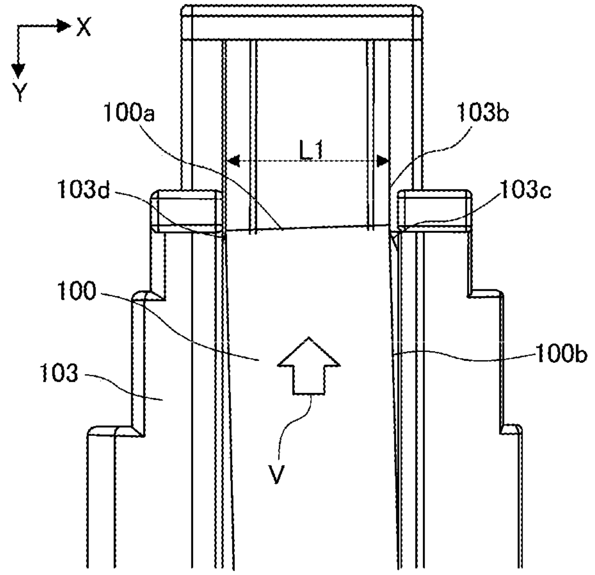

The heater 100 proceeds in the region of the second groove portion with the groove width L2 as a guiding groove that guides the heater in the direction indicated by arrow V from the state indicated by FIG. 4, and as shown in FIG. 5A, the one end portion 100*a* of the heater 100 brings in contact with the inclined surface 103*c* that connects the second groove portion with the groove width L2 of the pressing member 103 to the first groove portion with the groove width L1 of the pressing member 103, which is located on the one end portion side in the longitudinal direction of the pressing member 103. Then, as shown in FIG. 5B, the one end portion 100*a* of the heater 100 moves along the inclined surface 103*c* of the pressing member 103 in the direction indicated by arrow V of FIG. 5B in the groove of the pressing member 103 while being tilted. In this case, it is preferable that the angle $\alpha$ made between the inclined surface 103*c* and the direction Y is less than 30° in order for the heater 100 to move smoothly along the inclined surface 103*c*.

Figure 6A:
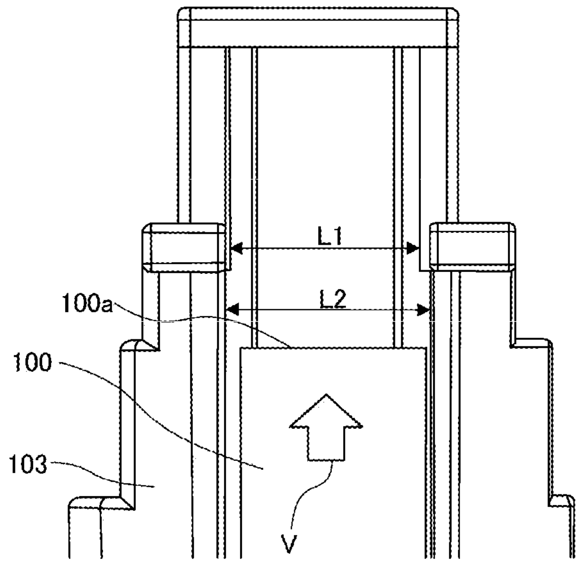
FIGS. 6A and 6B are diagrams showing a top view of the heater and the pressing member of the fixing device according to the embodiment of the present invention in the state where the heater is being moved on the pressing member.

As shown in FIG. 6A, the heater 100 moves such that the one end portion 100*a* of the heater 100 passes through the inclined surface 103*c* of the pressing member 103 and becomes located at the region of the first groove portion with the groove width L1 on the one end portion side of the longitudinal direction of the pressing member 103. The heater 100 continues to move in the direction indicated by arrow V of FIG. 6A such that the one end portion 100*a* is kept to be located in the region of the first groove portion with the groove width L1. Finally, the heater 100 is secured to the pressing member 103 with adhesive. Therefore, during the assemblage, adhesive is applied to the pressing member 103 or the heater 100, and the heater 100 is moved in the direction indicated by arrow V of FIG. 6A without dragging the adhesive by raising the other end portion (not shown) of the heater 100.

As shown in FIG. 6A, immediately before the one end portion 100*a* of the heater 100 is abutted against the surface of the end portion 103*e* of the groove 103*a* of the pressing member 103 in the direction Y, the one end portion 100*a* of the heater 100 is tilted with respect to the surface of the end portion 103*e* of the pressing member 103.

Figure 6B:
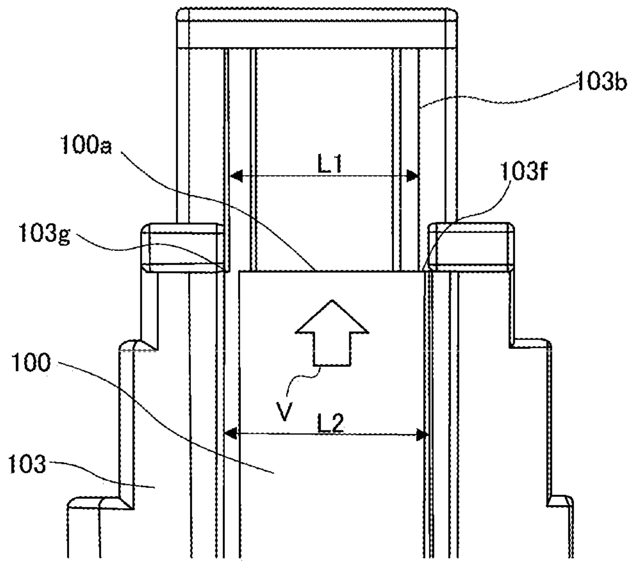

By the one end portion 100*a* of the heater 100 being abutted against the end portion 103*e* of the groove of the pressing member 103, the surface of the one end portion 100*a* of the heater 100 and the surface of the end portion 103*e* of the groove of the pressing member 103 becomes parallel to each other as shown in FIG. 6B. The fact that the one end portion 100*a* of the heater 100 is abutted against the end portion 103*e* of the groove of the pressing member 103 is detected by a sensor (not shown) of the automatic production apparatus.

When it is detected that the one end portion 100*a* of the heater 100 is abutted against the end portion 103*e* of the groove of the pressing member 103, the end portion 100*d* opposite to the one end portion 100*a* of the heater 100 in the direction Y, which is shown in FIG. 3, is brought closer to the pressing member 103 and is placed in the groove 103*a* of the pressing member 103.

The surface of the end portion 103*e* of the pressing member 103 is perpendicular to the surface of the positioning portion 103*b* of the surface of the end portion of the first groove portion of the pressing member 103 against which the surface of the end portion 100*b* of the heater 100 in the direction X is abutted. Further, in the state where the one end portion 100*a* of the heater 100 in the direction Y falls within the range of the groove with the groove width L1 of the pressing member, the one end portion 100*a* of the heater 100 becomes parallel to the surface of the end portion 103*e* of the pressing member. In this case, the end portion 100*d* opposite to the one end portion 100*a* in the direction Y of the heater 100 falls within the range of groove with the groove width L1 of the pressing member 103 in the direction X and the end portion of the heater 100 is not in contact with the end portion 103*e*.

Finally, in order to position the heater 100, the end portion 100*b* of the heater 100 in the widthwise direction (direction X) is abutted against the surfaces of the positioning portions 103*b* and 103*f*, which are on both end sides of the grooves of the pressing member 103 in the direction Y and which are on the surfaces of the end portions of the pressing member 103 in the direction X.

Next, the procedures of attaching the heater to the groove of a conventional pressing member by using an automatic production apparatus will be described.

Figure 7A:
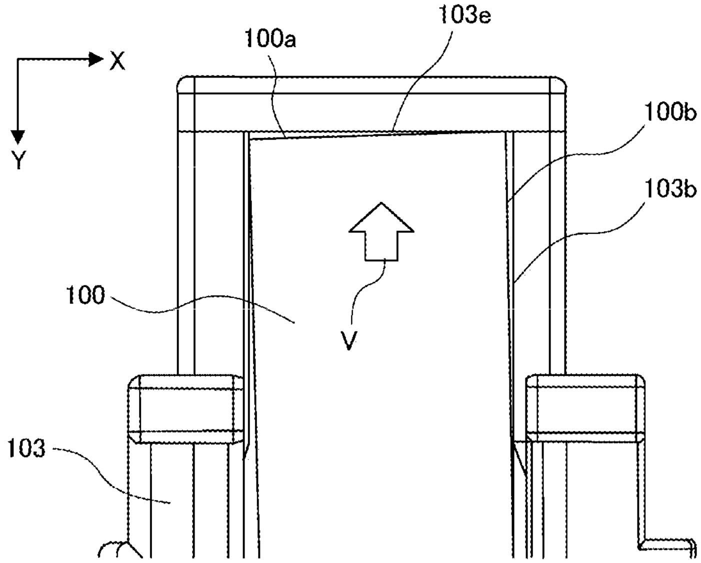
FIGS. 7A and 7B are diagrams showing a top view of a heater and a pressing member of a conventional fixing device in the state where the heater is being moved on the pressing member.
Figure 7B:
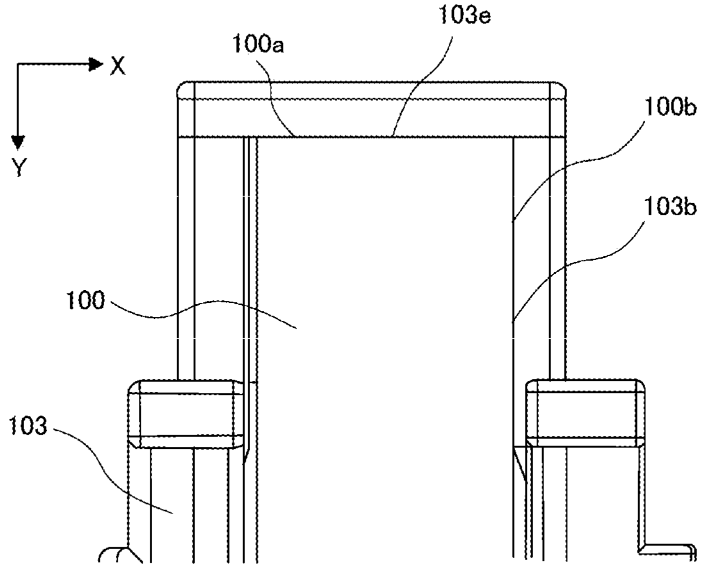

FIGS. 7A and 7B are diagrams showing top views of heater 100 and a conventional pressing member. Indicated in these figures is the step of moving the heater 100 from the region of the second groove portion with the groove width L2 of the conventional pressing member to the region of the first groove portion with the groove width L1 on the one end portion side in the direction Y. The surfaces of the conventional pressing member shown in FIGS. 7A and 7B which correspond to the surfaces 103*c* and 103*d* which connects the first groove portion with the groove width L1 of the groove 103*a* of the pressing member 103 to the second groove portion with the width groove L2 of the pressing member 103 according to the previously described embodiment are parallel with the direction X, not inclined to the direction of inserting the heater. In FIGS. 7A and 7B, the same reference characters are attached to the same or similar configurations as those of the previously described embodiment and the duplicate description will be omitted by referring them.

Similar to the previously described embodiment, by the automatic production apparatus shown in FIG. 3, the one end portion 100*a* of the heater 100 in the longitudinal direction (direction Y) is first placed on the second groove portion with the groove width L2 located at the central part of the pressing member 103 in the longitudinal direction that is wider than the first groove portion with the groove width L1 as shown in FIG. 7A. Then, the heater 100 is inserted along the longitudinal direction of the second groove portion of the pressing member 103, namely, in the direction indicated by arrow V of FIG. 7A.

When the heater 100 is moved in the direction indicated by arrow V of FIG. 7A, as shown in FIG. 7B, the one end portion 100*a* of the heater 100 is abutted against the surfaces 103*f* and 103*g* which are boundaries between the first groove portion with the groove width L1 and the second groove portion with the groove width L2 so that heater 100 is caught by the surfaces 103*f* and 103*g*.

In contrast, in the present embodiment, the heater can be smoothly attached to the groove provided on the pressing member in the assemblage by adopting the configuration of the pressing member described in the present embodiment.

As a result, key parts of a fixing device such as a heater and a pressing member can be attached in the assemblage by an automatic production apparatus. This prevents variations in assemblage by human manual work from occurring and enables to provide an image forming apparatus with high quality.

With the present invention, a fixing device and an image forming apparatus can be provided which enable easy assemblage using an automatic production apparatus, in which a heating member of a fixing device used in an electrophotographic image forming apparatus can be attached to a groove provided on the holding member for holding the heating member.

As a result, a heating member which is a key part of a fixing device can be attached in the assemblage by an automatic production apparatus. This prevents variations in assemblage by human manual work from occurring and enables to provide a fixing device and an image forming apparatus with high quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-177244, filed Oct. 13, 2023, which is hereby incorporated by reference herein in its entirety.

What is claimed is:

1. A fixing device comprising:

a heating member for fixing a toner image on a recording material;

a holding member that holds the heating member; and a roller configured to form a nip portion for nipping and conveying the recording material in cooperation with the heating member through a film, wherein the holding member includes:

a first groove portion provided on one end portion side of the holding member in a longitudinal direction of the holding member, the heating member being fitted into the first groove portion;

a second groove portion provided at a location closer to a central portion of the holding member in the longitudinal direction of the holding member than the first groove portion, a width of the second groove portion being larger than that of the first groove portion in a widthwise direction of the holding member, the heating member being fitted into the second groove portion;

an inclined portion that connects an end point of the first groove portion to an end point of the second groove portion, the end point of the first groove portion and the end point of the second groove portion being positioned at different locations in a conveying direction of the recording material and in a direction perpendicular to the conveying direction.

2. The fixing device according to claim 1, wherein the second groove portion is a guiding groove that guides the heating member to the first groove portion in the longitudinal direction of the holding member.

3. The fixing device according to claim 1, wherein the first groove portion includes a positioning portion in the widthwise direction of the holding member.

4. The fixing device according to claim 1, wherein in a state where the heating member is abutted on the surface of the end portion of the first groove portion in the longitudinal direction of the holding member, an end portion of the heating member that is abutted on the surface of the end portion in the longitudinal direction of the holding member is parallel to the surface of the end portion of the first groove in the widthwise direction of the holding member.

5. The fixing device according to claim 1, further comprising:

a rotating member that is heated by the heating member; and a pressing member configured to form a nip portion between the rotating member and the pressing member, and to nip and to convey the recording material to fix a toner image on the recording material.

6. An image forming apparatus comprising:

the fixing device according to claim 1; and an image forming portion configured to form a toner image on the recording material and to convey to the fixing device the recording material on which the toner image has been formed.

7. The fixing device according to claim 1, wherein the inclined portion is located between the first groove portion and the second groove portion downstream of the conveying direction of the recording material.

8. The fixing device according to claim 1, wherein the inclined portion is located between the first groove portion and the second groove portion upstream of the conveying direction of recording material.

9. The fixing device according to claim 1, further comprising a positioning portion disposed at one end of the first groove portion in a longitudinal direction, the positioning portion contacting the heating member for positioning of the heating member in the longitudinal direction.

10. A fixing device comprising:

a heating member for fixing a toner image on a recording material;

a holding member that holds the heating member; and a roller configured to form a nip portion for nipping and conveying the recording material in cooperation with the heating member through a film, wherein the holding member includes:

a first groove portion provided on one end portion side of the holding member in a longitudinal direction of the holding member, the heating member being fitted into the first groove portion;

a second groove portion provided at a location closer to a central portion of the holding member in the longitudinal direction of the holding member than the first groove portion, a width of the second groove portion being larger than that of the first groove portion in a widthwise direction of the holding member, the heating member being fitted into the second groove portion;

a third groove portion provided at a location between the first groove portion and the second groove portion, the third groove portion connected to the first groove portion and the second groove portion;

wherein the third groove portion has a first wall rising in the thickness direction from an area contacting a surface perpendicular to the thickness direction of the heating member, and a second wall opposing the first wall, wherein the distance in a conveying direction of the recording material between the first wall and the second wall gradually narrows toward the end of the holding member.

11. The fixing device according to claim 10, wherein the second groove portion is a guiding groove that guides the heating member to the first groove portion in the longitudinal direction of the holding member.

12. The fixing device according to claim 10, wherein the first groove portion includes a positioning portion in the widthwise direction of the holding member.

13. The fixing device according to claim 10, wherein in a state where the heating member is abutted on the surface of the end portion of the first groove portion in the longitudinal direction of the holding member, an end portion of the heating member that is abutted on the surface of the end portion in the longitudinal direction of the holding member is parallel to the surface of the end portion of the first groove in the widthwise direction of the holding member.

14. The fixing device according to claim 10, further comprising:

a rotating member that is heated by the heating member; and a pressing member configured to form a nip portion between the rotating member and the pressing member, and to nip and to convey the recording material to fix a toner image on the recording material.

15. The fixing device according to claim 10, further comprising:

a positioning portion disposed at one end of the first groove portion in a longitudinal direction, the positioning portion contacting the heating member for positioning of the heating member in the longitudinal direction.

16. The fixing device according to claim 10, wherein the first wall and a third wall rising in the thickness direction from the area in contact with the surface perpendicular to the thickness direction of the heating member of the first groove portion and a fourth wall rising in the thickness direction from the area in contact with the surface orthogonal to the thickness direction of the heating member of the second groove portion are arranged in succession, and the third wall and the fourth wall are the longitudinal direction of the holding member, and the first wall is connected to the third wall and the fourth wall.

17. The fixing device according to claim 10, wherein the first wall is located between the first groove portion and the second groove portion downstream of the conveying direction of the recording material.

18. The fixing device according to claim 10, wherein the first wall is located between the first groove portion and the second groove portion upstream of the conveying direction of recording material.

* * * * *